: 3,714,266
Patented Jan. 30, 1973

3,714,266
PROCESS FOR POLYMERIZATION OF TETRAHYDROFURAN
Kazuo Matsuda, Wakayama, Yoshiaki Tanaka, Osaka, and Takeyo Sakai and Ichiro Iwasa, Wakayama, Japan, assignors to Kao Soap Co., Ltd., Tokyo, Japan
No Drawing. Filed Mar. 10, 1970, Ser. No. 18,298
Claims priority, application Japan, Mar. 18, 1969, 44/20,665
Int. Cl. C07d 41/00, 43/00
U.S. Cl. 260—615 B                    6 Claims

ABSTRACT OF THE DISCLOSURE

Tetrahydrofuran is polymerized in the presence of a catalyst of (1) 8 to 40 percent by weight, based on the amount of tetrahydrofuran, of fuming sulfuric acid containing 15–43 wt. percent of $SO_3$, and (2) 0.05–20 percent by weight, based on the weight of fuming sulfuric acid, of perchloric acid. The reaction temperature is in the range of −40° C. to +100° C.

---

The present invention relates to a novel process for the polymerization of tetrahydrofuran. More particularly, it relates to a process for the ring-opening-polymerization of tetrahydrofuran in the presence of fuming sulfuric acid and perchloric acid as catalyst.

The polymerization of tetrahydrofuran in the presence of a cationic polymerization catalyst such as a Lewis acid or strong acid has been well known. The polymers thus obtained are in a liquid or solid state according to their degree of polymerization. However, in order to obtain a polymer having hydroxyl radicals at both terminal ends of the polymer molecule, it is necessary to completely hydrolyze the radicals such as chloride, acetyl ester, etc. at the terminal ends of the polymer molecule into hydroxyl radicals after the polymerization has been stopped by the addition of water. For this hydrolysis, strong reaction conditions are required, which will make the reaction procedure complex and will cause a considerable loss of the polymer. In case fluoro-sulfuric acid is used as a catalyst, polymers having hydroxyl radicals at both ends of the polymer molecule can be obtained easily by performing the hydrolysis in an acidic condition, but the coexistence of hydrofluoric acid is undesirable in view of the material for constructing the reaction apparatus, since it will require a very expensive material.

Further, in German Pat. No. 766,208, a process is disclosed wherein tetrahydrofuran is polymerized in the presence of 45 wt. percent fuming sulfuric acid. However, the polymerization process of said German patent will cause the partial carbonization and severe coloring of the resulting polymers and the decolorization of the polymer by various after-treatments is impossible or very difficult. Thus, the resulting polymers cannot be used as diols for the preparation of polyurethane.

We have found previously that colorless diol polymers having terminal hydroxyl radicals can be prepared economically through a far simpler reaction procedure and in a less expensive reaction apparatus than before by using a fuming sulfuric acid having a concentration within a specified critical range. However, after further studies, we have found that, by the coexistence of a small amount of perchloric acid as a co-catalyst with the fuming sulfuric acid having a concentration within said specified critical range, the molecular weight and the yield of polymerization of the polymer can be increased as compared with the case of using said fuming sulfuric acid alone and, in addition, the molecular weight of the polymer can be freely controlled.

The present invention relates to a process for the polymerization of tetrahydrofuran is having a presence of a fuming sulfuric acid in the concentration of $SO_3$ of about 15–43 wt. percent and about 0.05–20%, based on the fuming sulfuric acid, of perchloric acid.

The fuming sulfuric acid to be used in the process of the present invention should have an $SO_3$ concentration in the range of about 15–43 wt. percent. If a fuming sulfuric acid of an $SO_3$ concentration above 43 wt. percent is used, severe carbonization and coloring of the polymer would occur and the decoloration of the polymer by after treatments is difficult. On the other hand, if a fuming sulfuric acid of $SO_3$ concentration below 15 wt. percent is used, the polymerization yield will be low even in the coexistence of perchloric acid and the purpose of the coexistence would be defeated. In general, 28 wt. percent fuming sulfuric acid and 23 wt. percent fuming sulfuric acid which are readily available industrially will be favorably employed in carrying out the process of the present invention.

Perchloric acid to be used in the process of the present invention may be either 100% perchloric acid or its hydrate. However, 70 wt. percent to 60 wt. percent perchloric acid (hydrate) which is commercially available as a stable product will be preferably used, since the explosion hazard caused by the shock of adding 100% perchloric acid is great.

The optimum quantitative relation between the fuming sulfuric acid and the perchloric acid cannot be stated indiscriminately, since it varies according to the concentration of the fuming sulfuric acid and the water content of the perchloric acid (in the case of a hydrate) used. However, considering the yield of polymerization or the average molecular weight of the polymer, the preferable amount of perchloric acid (as 100%) is about 0.05–20% by weight based on the amount of the fuming sulfuric acid. Owing to the coexistence of perchloric acid even in only such a small amount as 0.05 wt. percent, the yield of polymerization and the average molecular weight of the polymer will be increased and, with 2–7 wt. percent of perchloric acid, the yield of polymerization and the average molecular weight of the polymer will become maximum. However, in the presence of more than 20 wt. percent of perchloric acid, the effect of the coexistence of the same will not be able to be obtained.

The catalyst in the process of the present invention is used in such an amount that the amount of the fuming sulfuric acid based on the amount of tetrahydrofuran will be 8–40% by weight.

The molecular weight of the polymer to be obtained will be able to be controlled by varying the amount of the catalyst relative to the amount of tetrahydrofuran, maintaining the proportion of the fuming sulfuric acid to perchloric acid constant. As the amount of the catalyst is increased, both the molecular weight and the yield of polymerization of the polymer will be decreased.

The polymerization reaction is performed by contacting tetrahydrofuran with both the fuming sulfuric acid and perchloric acid in the presence of a solvent (solution polymerization) or in the absence of a solvent (bulk polymerization). In this reaction, the order of the addition of the catalyst compounds is not significant. The fuming sulfuric acid may be added to the mixture of tetrahydrofuran and perchloric acid, or perchloric acid may be added to the mixture of tetrahydrofuran and the fuming sulfuric acid, or the fuming sulfuric acid and perchloric acid may be added at the same time to tetrahydrofuran.

The polymerization solvent can be used in case of need, though the polymerization velocity will be lowered in general in the presence of a polymerization solvent. As the polymerization solvents, there may be used those solvents which will give no remarkably unfavorable influence to the polymerization such as aliphatic hydrocarbons, alicyclic hydrocarbons, ethers and halogenated hydrocarbons, which include, for example, hexane, cyclohexane and 1,2-dichloroethane. As to the quantity of the solvents, there exists no critical limitation.

The polymerization is carried out in general in a nitrogen-replaced and sealed reaction vessel, but it may be carried out also in an open reaction system if the incoming of humidity can be prevented.

The polymerization temperature can be selected in the range of from −40° C. to 100° C., but a temperature of from −20° C. to 10° C. is preferable.

The fractional purification of the polymer products in the bulk polymerization of tetrahydrofuran according to the process of the present invention can be performed as follows:

After stopping the polymerization by the addition of water, the reaction mixture is heated to recover the non-reacted monomer therefrom and then it is further heated to keep the temperature of the mixture in the range of 90–100° C. to complete the hydrolysis of the sulfuric acid ester radicals at the terminal ends of the polymer. Then, the reaction mixture is allowed to stand at room temperature so as to separate the polymer product having terminal hydroxyl groups at both ends of the polymer molecules as the upper oil layer, collecting the oil layer and subjecting the oil layer to the neutralization, dehydration and desalting steps to obtain purified ring-opened tetrahydrofuran, polymer products.

The polymers obtained according to the process of the present invention are in the form of colorless liquid or waxy solid which can be used as a polyol for the preparation of polyurethane.

The process of the present invention will be illustrated below by way of examples, which by no means limit the invention. Parts and percentages described in these examples are all by weight.

EXAMPLE 1

In a 3000 ml. four-necked flask provided with a stirrer, a thermometer, a reflux condenser and a dropping funnel, 100 parts of tetrahydrofuran are charged. External cooling is effected and a nitrogen blanket is maintained. Under sufficient stirring and keeping the temperature between −4° C. and 2° C., 22 g. of 30% fuming sulfuric acid are added dropwise through the dropping funnel. Then the dropping funnel is replaced by another clean dropping funnel, through which 70% perchloric acid is directly added dropwise in the respective amounts shown in Table 1, while the temperature in the system is kept below 2° C. Since this is a quite violent exothermic reaction, care should be taken so as to avoid overheating by means of sufficient stirring and cooling.

After the completion of the addition, the stirring is continued for additional two hours at a temperature in the range of from −4° C. to 2° C. Thereafter 200 parts of water are added to stop the polymerization reaction. A dehydration tube is attached to the reflux condenser and, under stirring, the temperature is raised by means of a water bath and the non-reacted monomer is recovered through the dehydration tube. The heating is continued at 90–100° C. for an additional two hours under stirring to effect the hydrolysis of the terminal end radicals of the polymer. The water bath is taken away and the reaction mixture is allowed to cool whereby the reaction mixture is divided into two layers. The upper oil layer is collected and acids contained therein are neutralized. After the subsequent dehydration and desalting treatments, purified polyethers having terminal hydroxyl radicals at both ends of the polymer molecules are obtained.

The effect of the amounts of addition of perchloric acid on the yield of polymerization and the average molecular weight of the obtained polymer are as shown in Table 1.

TABLE 1.—EFFECT OF AMOUNTS OF ADDITION OF PERCHLORIC ACID ON OBTAINED POLYMER

| Analytical value | Amount of 70% perchloric acid (g.) | | | | | | | | |
|---|---|---|---|---|---|---|---|---|---|
| | 0 | 0.05 | 0.25 | 0.5 | 0.75 | 1.0 | 1.5 | 2.8 | 4.0 |
| Yield of polymerization (percent) | 50 | 51 | 62 | 68 | 67 | 68 | 60 | 53 | 51 |
| Average molecular weight calculated from terminal OH group | 993 | 1,000 | 1,279 | 1,532 | 1,710 | 1,692 | 1,500 | 1,350 | 1,310 |
| Chlorine content | 0 | 0 | 0 | 0 | 0 | 0 | 0 | 0 | 0 |
| Color (APHA) | <30 | <30 | <30 | <30 | <30 | <30 | <30 | <30 | <30 |

From the results in the above Table 1, it is evident that the yield of polymerization and the average molecular weight are increased in case of using 0.25–4.0 g. of 70% perchloric acid per 100 g. of tetrahydrofuran in addition to 22 g. of 30% fuming sulfuric acid, as compared with the case of using only 22 g. of 30% fuming sulfuric acid.

EXAMPLE 2

In a 300 ml. four-necked flask provided with a stirrer, a thermometer, a reflux condenser and a dropping funnel, 100 g. of tetrahydrofuran are charged. External cooling is effected and nitrogen blanket is maintained. Under sufficient stirring and keeping the temperature between 0° C. to 5° C., the same procedures as in Example 1 are repeated except that the relative proportion of the amounts of 28% fuming sulfuric acid/70% perchloric acid is fixed at 22.7 and that the amounts of the catalyst are varied as shown in Table 2.

The effects of the amounts of the catalyst on the yield of polymerization and the average molecular weight of the obtained polymer are as shown in Table 2.

TABLE 2.—RELATION BETWEEN AMOUNTS OF CATALYST AND YIELD OF POLYMERIZATION AND AVERAGE MOLECULAR WEIGHT OF OBTAINED POLYMER

| Analytical value | Amount of 28% fuming sulfuric acid | | | | | | | |
|---|---|---|---|---|---|---|---|---|
| | 8 | 11 | 17.5 | 20 | 25 | 27 | 34 | 40 |
| | Amount of 70% perchloric acid (g.) | | | | | | | |
| | 0.35 | 0.48 | 0.77 | 0.88 | 1.10 | 1.19 | 1.50 | 1.76 |
| Yield of polymerization (percent) | 83 | 80 | 74 | 72 | 69 | 67 | 61 | 56 |
| Average molecular weight calculated from terminal OH group | 8,150 | 6,150 | 2,850 | 2,000 | 1,500 | 1,450 | 1,050 | 850 |

NOTE.—Amount of 28% fuming sulfuric acid/amount of 70% perchloric acid=22.7 (constant).

As shown in Table 2, the molecular weight and the yield of polymerization can be varied by varying the amount of the catalyst mixture consisting of fuming sulfuric acid and perchloric acid. However, if the fuming sulfuric acid alone is used as a catalyst as shown in Table 3, the molecular weight of the obtained polymer will be around 1000 and the yield of polymerization will be below 60%, even if the amount of the catalyst is varied.

TABLE 3.—EFFECT OF AMOUNTS OF FUMING SULFURIC ACID ON OBTAINED POLYMER

| Amount of— | | | | |
|---|---|---|---|---|
| Tetra-hydro-furan (g.) | 28% fuming sulfuric acid (g.) | Polymer (g.) | Average molecular weight | Color (APHA) |
| 100 | 15 | 26.1 | 1,050 | 10 |
| 100 | 27 | 53.8 | 1,004 | 10 |
| 100 | 35 | 54.0 | 835 | 10 |

NOTE.—Reaction conditions are the same as in Table 2.

EXAMPLE 3

In a 300 ml. four-necked flask provided with a stirrer, a thermometer, a reflux condenser and a dropping funnel, 100 parts of tetrahydrofuran are charged. External cooling is effected and a nitrogen blanket is maintained. Under sufficient stirring and keeping the temperature between 0° C. and 5° C., a predetermined amount of 70% perchloric acid is added through the dropping funnel and then a predetermined amount of 28% fuming sulfuric acid is added dropwise. After the completion of the addition, the stirring is continued at 0° C. for an additional one hour. The reaction is then stopped, the non-reacted monomer is recovered and the hydrolysis of the terminal radicals of the polymer is effected in the same manner as in Example 1. The product is allowed to cool and is subjected to the neutralization, dehydration and desalting treatments to obtain the purified polyether-glycol polymer in the same manner as in Example 1.

The relation between the amounts of the catalyst and the analytical values of the resulting polymer is as shown in Table 4.

TABLE 4

| Analytical value | Amount of 70% perchloric acid (part) | | | | |
|---|---|---|---|---|---|
| | 1.5 | 1.2 | 0.75 | 0.50 | 1.0 |
| | Amount of 28% fuming sulfuric acid | | | | |
| | 34 | 27 | 17.5 | 11.0 | 8.3 |
| Average molecular weight calculated from terminal OH group | 1,052 | 1,495 | 2,820 | 6,154 | 9,180 |
| Chlorine content (percent) | 0 | 0 | 0 | 0 | 0 |
| Color (APHA) | <30 | <30 | <30 | <30 | <30 |

In the following Examples 4–6, the experiments are performed with the same recipe as in Example 3 but the order of the addition of the catalyst compounds is changed.

EXAMPLE 4

Directly after the addition of 34 parts of 28% fuming sulfuric acid into 100 parts of tetrahydrofuran, 1.5 parts of 70% perchloric acid are added therein. After the subsequent aging reaction and after-treatments, 58.3 parts of a purified polyether polyglycol polymer are obtained. The properties of the polymer are as follows:

Average molecular weight calculated from terminal
  OH group _____ 1058
Color (APHA) _____ <30

EXAMPLE 5

34 parts of 28% fuming sulfuric acid are added dropwise into 100 parts of tetrahydrofuran. At the same time, 1.5 parts of 70% aqueous perchloric acid solution are added dropwise therein through another inlet, adjusting its dropping time to the dropping time of the fuming sulfuric acid. After the aging reaction and after-treatments, 57.9 parts of a purified polyether polyglycol polymer are obtained. The properties of the polymer are as follows:

Average molecular weight calculated from terminal
  OH group _____ 1046
Color (APHA) _____ <30

EXAMPLE 6

In 100 parts of tetrahydrofuran, the mixture of 34 parts of 28% fuming sulfuric acid and 1.5 parts of 70% perchloric acid are added dropwise. After the aging reaction and after-treatments, 58.5 parts of a purified polyether polyglycol polymer are obtained. The properties are as follows:

Average molecular weight calculated from terminal
  OH group _____ 1042
Color (APHA) _____ <30

EXAMPLE 7

In a 500 ml. four-necked flask provided with a stirrer, a thermometer, a reflux condenser and a dropping funnel, 100 parts of tetrahydrofuran and 30 parts of 1,2-dichloroethane as a solvent are charged. External cooling is effected. Under sufficient stirring and keeping the temperature between −4° C. and 0° C., 1.92 parts of 70% perchloric acid are added dropwise through the dropping funnel. Then the dropping funnel is replaced by another clean dropping funnel, through which 29 parts of 28% perchloric acid are added dropwise through said clean dropping funnel over about 1 hour.

After the completion of the addition, the stirring is continued for an additional five hours to conduct the aging reaction. The viscosity of the reaction mixture in the system on the completion of the aging reaction is about 800 cp. and, if the solvent is not used, the mixture will solidify and will not be able to be stirred. Thereafter 200 parts of water are added to stop the polymerization reaction. A dehydration tube is attached to the reflux condenser and, under stirring, the temperature is raised by means of a water bath and the non-reacted tetrahydrofuran monomer and 1,2-dichloroethane are recovered through the dehydration tube. The heating is continued at 90–100° C. for an additional two hours under stirring to effect the hydrolysis of the terminal radicals of the polymer. The purification of the polymer is carried out by substantially the same procedures as in Example 1, thus obtaining 52.7 parts of a purified polyether polyglycol polymer. The properties of the polymer are as follows:

Average molecular weight calculated from terminal
  OH group _____ 1326
Color (APHA) _____ <30
Content of chlorine (percent) _____ 0

EXAMPLE 8

According to the procedures described in Example 7, 100 parts of tetrahydrofuran and 50 parts of 1,2-dichloroethane as a solvent are charged and, after the dropwise addition of 1.92 parts of 70% perchloric acid, 13 parts of 28% fuming sulfuric acid are added dropwise. The aging reaction is carried out for 22 hours at the same temperature as in Example 7. (The viscosity of the reaction mixture at the end of the aging reaction is 3240 cp. and, if the solvent is not used, the mixture will solidify completely.) Then 100 parts of water are added to stop the polymerization reaction. The purification treatment of the polymer is conducted according to the procedure described in Example 7 and 61.8 parts of a purified polyether polyglycol polymer are obtained. The properties are as follows:

Average molecular weight calculated from terminal
  OH group _____ 8430
Color (APHA) _____ 50
Content of chlorine (percent) _____ 0

What we claim is:

1. A process for the polymerization of tetrahydrofuran, which comprises polymerizing tetrahydrofuran at a temperature in the range of −20° C. to +10° C. in the presence of a co-catalyst consisting essentially of (1) from 8 to 40 percent by weight, based on the amount of tetrahydrofuran, of fuming sulfuric acid containing from 15 to 43 wt. percent of $SO_3$ and (2) from about 0.05 to 20 wt. percent, based on the amount of said fuming sulfuric acid, of perchloric acid, calculated as 100% perchloric acid, until a polymer is formed; then adding water to the reaction mixture to stop the polymerization; raising the temperature of the reaction mixture to recover non-reacted tetrahydrofuran therefrom and then maintaining the reaction mixture at a temperature of 90° to 100° to complete the hydrolysis of the sulfuric acid ester radicals of the polymer at both ends of the polymer molecules; cooling the mixture to separate the polymer having terminal hydroxyl groups at both ends of the molecule as an upper oil layer; collecting the oil layer and subjecting same to neutralization, dehydration and desalting steps to obtain the purified polymer.

2. The process as claimed in claim 1, wherein 23 wt. percent or 28 wt. percent fuming sulfuric acid is used and said perchloric acid is a hydrate having a perchloric acid concentration of 60 to 70 wt. percent.

3. The process as claimed in claim 1, wherein the polymerization reaction is carried out in the absence of a solvent.

4. The process as claimed in claim 1, wherein the polymerization reaction is carried out in the presence of a solvent selected from the group consisting of aliphatic hydrocarbons, alicyclic hydrocarbons, halogenated hydrocarbons and ethers.

5. The process as claimed in claim 4, wherein said solvent is 1,2-dichloroethane.

6. The process as claimed in claim 1, wherein the amount of perchloric acid is 2 to 7% by weight based on the amount of the fuming sulfuric acid.

References Cited

UNITED STATES PATENTS

| 3,358,042 | 12/1967 | Dunlop et al. | 260—615 B |
| 2,751,419 | 6/1956 | Hill et al. | 260—615 B |

FOREIGN PATENTS

| 766,208 | 6/1953 | Germany | 260—615 B |

HOWARD T. MARS, Primary Examiner